US010197269B2

(12) United States Patent
Li et al.

(10) Patent No.: US 10,197,269 B2
(45) Date of Patent: Feb. 5, 2019

(54) BURNER ASSEMBLY WITH LOW NO$_x$ EMISSIONS

(71) Applicant: Nuvera Fuel Cells, LLC, Billerica, MA (US)

(72) Inventors: Zhijiang Li, Franklin, MA (US); Mohsen Behnam, Worcester, MA (US); Paul Gaffuri, Somerville, MA (US); Jordan McGinty, Marlborough, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 155 days.

(21) Appl. No.: 15/213,527

(22) Filed: Jul. 19, 2016

(65) Prior Publication Data
US 2017/0030581 A1    Feb. 2, 2017

Related U.S. Application Data

(60) Provisional application No. 62/199,546, filed on Jul. 31, 2015.

(51) Int. Cl.
*F23D 14/22*    (2006.01)
*F23D 14/14*    (2006.01)
(Continued)

(52) U.S. Cl.
CPC ............ *F23D 14/14* (2013.01); *B01J 8/0496* (2013.01); *B01J 12/00* (2013.01); *C01B 3/34* (2013.01);
(Continued)

(58) Field of Classification Search
CPC .......... F23D 14/14; F23D 14/22; F23D 14/24; F23D 14/84; F23D 2213/00;
(Continued)

(56) References Cited

U.S. PATENT DOCUMENTS 1,800,281 A * 4/1931 Buschler ................. F23C 99/00
110/327
4,313,721 A * 2/1982 Henriques ............. F23D 11/406
239/424.5
(Continued)

FOREIGN PATENT DOCUMENTS

DE    3837635 A1 *  5/1990  .............. F23C 7/002
DE    3837635 A1 *  5/1990  .............. F23C 7/002
(Continued)

OTHER PUBLICATIONS

PCT Notification of Transmittal of the International Search Report and the Written Opinion of the International Searching Authority, issued in International Application No. PCT/US2016/042895, dated Nov. 7, 2016.

*Primary Examiner* — Gregory L Huson
*Assistant Examiner* — Daniel E Namay
(74) *Attorney, Agent, or Firm* — Finnegan, Henderson, Farabow, Garrett & Dunner LLP

(57) ABSTRACT

The present disclosure is directed to a burner assembly for generating a heat source. The burner assembly may include a combustion plate having a first surface and a second surface. The combustion plate may include a first plurality of holes extending from the first surface to the second surface arranged in a first circle and a second plurality of holes extending from the first surface to the second surface arranged in a second circle. The first circle and second circle may be arranged in concentric circles. The burner assembly may further be configured to have at least one of the holes having a longitudinal axis extending at a first acute angle from a plane of the combustion plate. The burner assembly may further be configured to have at least one of the holes having the longitudinal axis extending at a second acute (Continued)

angle from a tangent line of one of the concentric circles on the plane of the combustion plate.

14 Claims, 8 Drawing Sheets

(51) Int. Cl.

| | | |
|---|---|---|
| *C01B 3/34* | (2006.01) | |
| *B01J 8/04* | (2006.01) | |
| *F23M 5/00* | (2006.01) | |
| *F23M 20/00* | (2014.01) | |
| *F23L 1/00* | (2006.01) | |
| *F23D 14/24* | (2006.01) | |
| *B01J 12/00* | (2006.01) | |

(52) U.S. Cl.
CPC ............. *F23D 14/22* (2013.01); *F23D 14/24* (2013.01); *F23L 1/00* (2013.01); *F23M 5/00* (2013.01); *F23M 20/00* (2015.01); *B01J 2219/00157* (2013.01); *C01B 2203/0205* (2013.01); *C01B 2203/0811* (2013.01); *C01B 2203/1241* (2013.01); *F23D 2213/00* (2013.01)

(58) Field of Classification Search
CPC .......... F23D 2213/102; F23D 2213/105; F23L 1/00; C01B 3/34; C01B 3/32; C01B 2203/0205; C01B 2203/0811; C01B 2203/1241; C01B 2203/0216
USPC .............................. 431/195, 185, 187, 9, 181
See application file for complete search history.

(56) References Cited

U.S. PATENT DOCUMENTS

| | | | | |
|---|---|---|---|---|
| 4,357,134 A * | 11/1982 | Katsushige | ............. | F23C 9/006 431/115 |
| 4,494,923 A * | 1/1985 | Guillaume | ............. | F23D 14/32 431/264 |
| 4,632,309 A * | 12/1986 | Reimer | ................... | B05B 7/205 239/8 |
| 4,969,814 A * | 11/1990 | Ho | ............................. | F23C 7/00 239/419.5 |
| 5,347,937 A * | 9/1994 | Vatsky | .................... | F23C 7/006 110/261 |
| 5,803,725 A * | 9/1998 | Horn | ........................ | F23D 14/32 239/416.4 |
| 5,860,803 A * | 1/1999 | Schindler | ................ | F23C 6/047 431/10 |
| 5,882,184 A * | 3/1999 | Feldermann | ............ | F23D 14/24 239/424.5 |
| 6,050,809 A * | 4/2000 | Fayerman | ................ | F23C 3/004 239/434 |
| 6,089,476 A * | 7/2000 | Sugimoto | .......... | F02M 61/1806 239/533.12 |
| 6,241,510 B1 * | 6/2001 | Anderson | ............... | F23D 14/22 239/424.5 |
| 6,363,746 B1 * | 4/2002 | Wei | .................... | C03B 37/0142 239/416.5 |
| 6,524,096 B2 * | 2/2003 | Pribish | .................... | F23D 11/36 239/132.5 |
| 6,604,937 B1 * | 8/2003 | Mahoney | ................ | C21O 5/5217 266/222 |
| 6,672,859 B1 * | 1/2004 | Rabovitser | ............. | F23C 6/047 431/10 |
| 6,751,987 B1 * | 6/2004 | Ball | .................... | C03B 19/1423 239/270 |
| 6,916,172 B2 * | 7/2005 | Steiner | .................. | F23D 11/007 431/181 |
| RE40,199 E * | 4/2008 | Sugimoto | .......... | F02M 61/1806 239/533.12 |
| 7,566,218 B2 * | 7/2009 | Aldrich | ................... | F23C 3/002 431/183 |
| 8,393,893 B2 * | 3/2013 | Schroder | ................. | F23C 6/047 110/260 |
| 8,419,421 B2 * | 4/2013 | Hirota | ..................... | F23D 14/78 431/187 |
| 8,561,602 B2 * | 10/2013 | Andors | ................... | F24C 3/006 126/512 |
| 2001/0032572 A1 * | 10/2001 | Mukai | ....................... | F23D 1/00 110/262 |
| 2003/0108834 A1 * | 6/2003 | Pelton | .................... | F23D 14/22 431/8 |
| 2004/0009446 A1 * | 1/2004 | Tsiava | ................ | C01B 17/0417 431/187 |
| 2004/0187526 A1 * | 9/2004 | Shirota | ............... | C03B 19/1423 65/531 |
| 2006/0057518 A1 * | 3/2006 | Aldrich | ................... | F23C 3/002 431/116 |
| 2007/0037106 A1 * | 2/2007 | Kobayashi | ............. | F23D 14/22 431/8 |
| 2007/0254251 A1 * | 11/2007 | Cao | ........................ | F23C 6/047 431/10 |
| 2008/0096146 A1 * | 4/2008 | Li | .......................... | F23C 6/045 431/9 |
| 2008/0145657 A1 * | 6/2008 | Igarashi | .................... | B22F 9/22 428/402 |
| 2009/0142716 A1 * | 6/2009 | Jubb | ......................... | F23R 3/14 431/9 |
| 2010/0139324 A1 * | 6/2010 | Boulanov | ............. | C03B 37/048 65/469 |
| 2010/0281872 A1 * | 11/2010 | Hadley | .................. | F23D 14/58 60/748 |
| 2012/0073332 A1 * | 3/2012 | Yoshida | ............. | C03B 19/1423 65/531 |
| 2012/0189965 A1 * | 7/2012 | Niehoff | ................... | F23C 6/047 431/9 |
| 2016/0008830 A1 * | 1/2016 | Yamamoto | ............. | F23D 14/22 239/79 |

FOREIGN PATENT DOCUMENTS

| | | | |
|---|---|---|---|
| EP | 2 236 936 A2 | 10/2010 | |
| ES | 2 433 121 | 12/2013 | |
| JP | 03230006 A * | 10/1991 | |
| JP | 03230006 A * | 10/1991 | |
| JP | 06101821 A * | 4/1994 | |
| JP | 06213452 A * | 8/1994 | |
| JP | 2001116212 A * | 4/2001 | |
| JP | 2001116212 A * | 4/2001 | |
| JP | 2002257344 A * | 9/2002 | |
| JP | 2002257344 A * | 9/2002 | |
| JP | 2002267117 A * | 9/2002 | |
| JP | 2002267117 A * | 9/2002 | |
| JP | 2002295815 A * | 10/2002 | |
| JP | 2002295815 A * | 10/2002 | |
| JP | 2012-098027 A | 5/2012 | |
| JP | 2013-242114 A | 12/2013 | |
| WO | WO 8808503 A1 * | 11/1988 | ............... F23C 7/00 |
| WO | WO-2007140740 A1 * | 12/2007 | ............ F23D 14/22 |
| WO | WO 2007140740 A1 * | 12/2007 | ............ F23D 14/22 |

\* cited by examiner

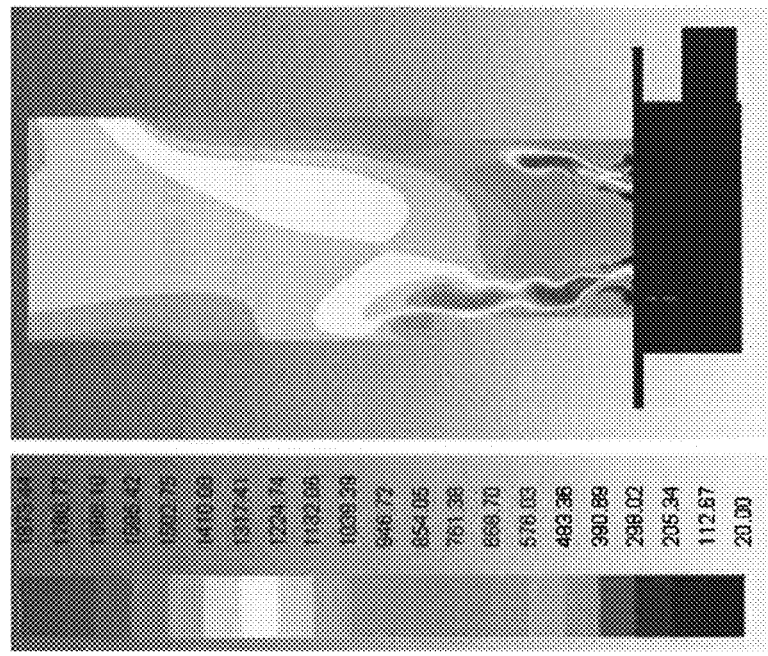
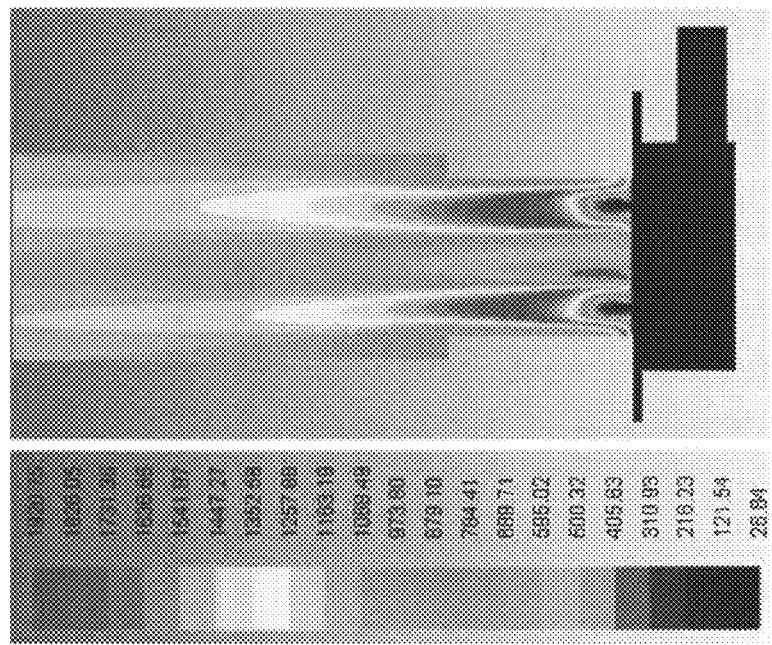
FIG. 7

BURNER ASSEMBLY WITH LOW $NO_x$ EMISSIONS

This application claims the benefit of U.S. Provisional Application No. 62/199,546, filed Jul. 31, 2015, which is incorporated by reference in its entirety.

The present disclosure is directed toward a burner assembly having low $NO_x$ formation and/or emission and methods of using the burner assembly.

Steam reforming is a method widely used for producing hydrogen from hydrocarbons, such as methane. The basic chemistry of steam reforming is the temperature-driven reaction of a hydrocarbon feedstock with water steam to produce a mixture of primarily hydrogen, water, carbon monoxide, and carbon dioxide ("synthesis gas"), sometimes referred to as a "reformate." A "steam reformer" mainly comprises two modules: a burner assembly and a reformer assembly. The burner assembly provides the source of thermal energy to the reformer assembly, where the steam reforming reaction between the hydrocarbon feedstock and steam takes place. The burner assembly generally generates heat by the combustion of a fuel gas and produces a combustion exhaust gas interacting with the reformer assembly through radiation and convection heat transfer.

The combustion of the fuel gas of the burner assembly is a high-temperature exothermic reaction and requires an oxidant, typically atmospheric air. The combustion of the fuel gas can produce thermal oxide of nitrogen ($NO_x$) through high-temperature oxidation of the diatomic nitrogen found in the air, known as the extended Zeldovich mechanism. $NO_x$ may include both nitrogen oxide ($NO_x$) and nitrogen dioxide ($NO_2$), which can convert to each other. $NO_x$ is toxic and classified as a greenhouse gas that has a longer life than carbon dioxide and methane. $NO_x$ can react to form photochemical smog and acid rain and can also form tropospheric ozone, toxic to humans in ambient air. $NO_x$ also reacts with organic chemicals or ozone to form a variety of toxic products and airborne carcinogens. Different counties and states have set stringent standards of acceptable levels of $NO_x$ for combustion burners, furnaces, or engines. For example, the California's South Coast Air Quality Management District (SCAQMD) has set a limit of 14 nanograms/Joule for the $NO_x$ emissions of natural gas-fired furnaces according to Rule 1146.2.

Thermal $NO_x$ generation during combustion is highly temperature-dependent. The flame temperature is a primary variable that influences the generation of thermal $NO_x$ during combustion. The higher the flame temperature, the higher the concentration of $NO_x$ can be in the combustion exhaust gas. Thus, reducing the temperature of the combustion flame may result in reduced $NO_x$ formation and/or emission. Methods to reduce $NO_x$ formation and/or emission include recirculating combustion exhaust gas into the flame and optimizing mixing of the fuel gas with air to reduce flame temperature by implementing, for example, baffle designs in the burner assembly. However, such burner assembly is either too complex in design or operation, or too expensive or unsuitable for either large scale industrial or small scale steam reformers.

Therefore, there is a need for an improved burner assembly and method for providing a source of thermal energy with low $NO_x$ formation and/or emission.

In consideration of the aforementioned circumstances, the present disclosure is directed toward a burner assembly having low $NO_x$ formation and/or emission and methods of using the burner assembly.

In one aspect, the present disclosure is directed to a burner assembly. The burner assembly may include a combustion plate having a first surface and a second surface. The combustion plate may comprise a first plurality of holes extending from the first surface to the second surface arranged in a first circle. The combustion plate may further include a second plurality of holes extending from the first surface to the second surface arranged in a second circle. The first circle and the second circle may be concentric circles and at least one of the holes may have a longitudinal axis extending at an acute angle from a plane of the combustion plate.

In another aspect, the present disclosure is directed to a method for providing a heat source from a burner assembly. The method may include directing a fuel gas flow through a first plurality of holes extending from a first surface to a second surface of a combustion plate. The method may also include directing an air flow through a second plurality of holes extending from the first surface to the second surface of the combustion plate. The method may further include combusting the fuel gas flow and the air flow directed through the holes. The first plurality of holes may be arranged in a first circle. The second plurality of holes may also be arranged in a second circle. The first and second circles may be concentric circles and at least one of the holes may have a longitudinal axis extending at an acute angle from a plane of the combustion plate.

In another aspect, the present disclosure is directed to a hydrogen generator system for generating hydrogen. The system may include a reformer assembly and a burner assembly. The burner assembly may include a combustion plate having a first surface and a second surface. The combustion plate may include a first plurality of holes extending from the first surface to the second surface arranged in a first circle. The combustion plate may further include a second plurality of holes extending from the first surface to the second surface arranged in a second circle. The first circle and second circle may be concentric circles and at least one of the holes may have a longitudinal axis extending at an acute angle from a plane of the combustion plate. The burner assembly may be configured to combust a fuel gas flow directed through the first plurality of holes and an air flow directed through the second plurality of holes to generate a combustion exhaust gas flow supplied as a heat source to the reformer assembly.

It is to be understood that both the foregoing general description and the following detailed description are exemplary and explanatory only and are not restrictive of the present disclosure as claimed.

The accompanying drawings, which are incorporated in and constitute a part of this specification, illustrate several embodiments of the present disclosure and together with the description, serve to explain the principles of the present disclosure.

FIG. 1 a partial cross-sectional view of a burner assembly, according to an exemplary embodiment.

FIG. 7 is a schematic illustration comparing a normal burner assembly and a burner assembly according to an exemplary embodiment.

While the present disclosure is described herein with reference to illustrative embodiments of a burner assembly with low $NO_x$ formation and/or emission, it is understood that the systems and methods of the present disclosure may be employed with various types of burner assembly applications. Those having ordinary skill in the art and access to the teachings provided herein will recognize additional modifications, applications, embodiments, and substitution of equivalents that all fall within the scope of the disclosure. Accordingly, the disclosure is not to be considered as limited by the foregoing or following descriptions.

Other features and advantages and potential uses of the present disclosure will become apparent to someone skilled in the art from the following description of the disclosure, which refers to the accompanying drawings.

Figure 1:
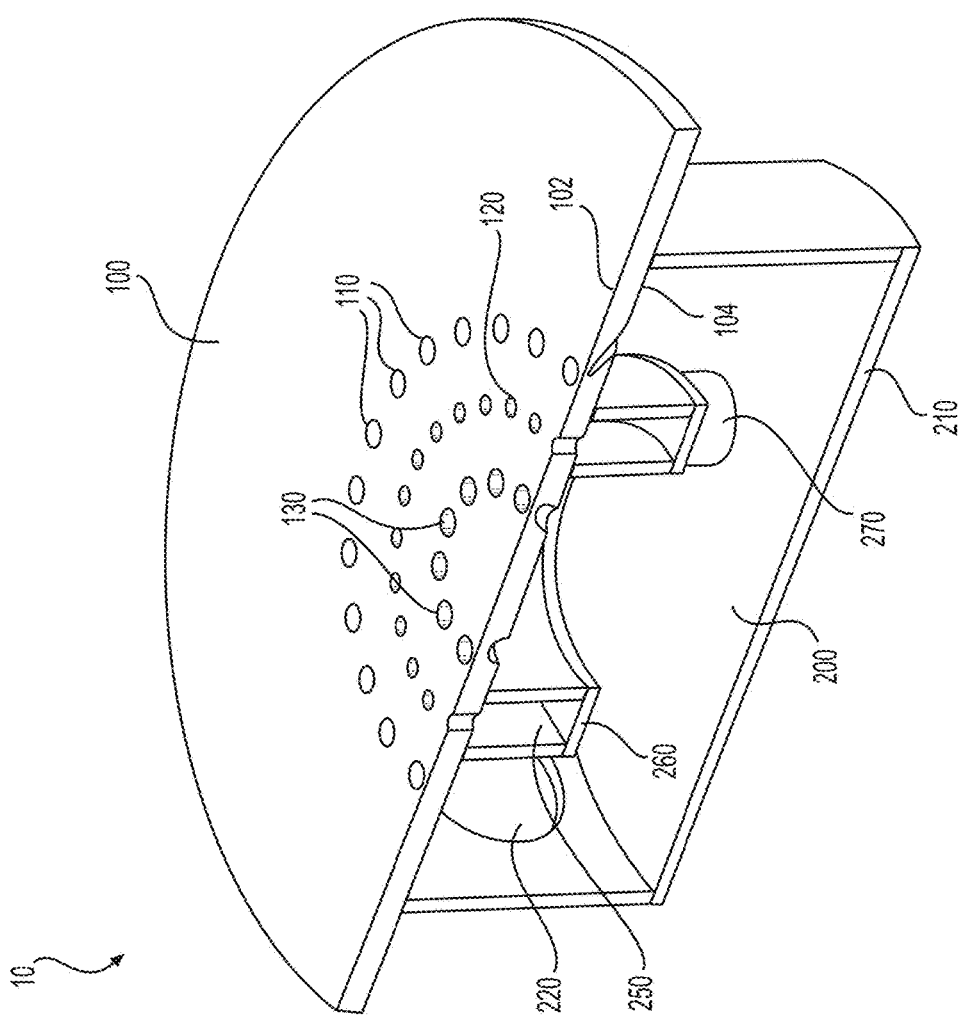

FIG. 1 depicts a partial cross-sectional view of a burner assembly 10, according to an exemplary embodiment. Burner assembly 10 may include, among other things, a combustion plate 100, an air gas chamber 200, and a fuel gas chamber 250. Combustion plate 100 may have a top surface 102, a bottom surface 104, and a predetermined thickness between top surface 102 and bottom surface 104. Combustion plate 100 may further have a plurality of holes 110, 120, and/or 130 extending from top surface 102 to bottom surface 104. In some embodiments, combustion plate 100 may be circular, elliptical, rectangular, or other geometric shape.

Air gas chamber 200 may be a hollow cylinder, having one end removably or permanently attached to bottom surface 104 of combustion plate 100 and the other end removably or permanently attached to a bottom plate 210. An air inlet 220 may be attached to air gas chamber 200 and may be configured to supply an air flow, providing oxidant for the combustion reaction. Fuel gas chamber 250 may be an annular hollow tube, having one end removably or permanently attached to bottom surface 104 of combustion plate 100 and the other end removably or permanently attached to a bottom plate 260. A fuel gas inlet 270 may be attached to fuel gas chamber 250 and may be configured to supply a fuel gas flow, providing fuel for the combustion reaction. In some embodiments, fuel gas chamber 250 may be enclosed in air chamber 200 and fuel gas inlet 270 may penetrate though air gas chamber 200, for example, through bottom plate 210 to reach and attach to fuel gas chamber 250. In other embodiments, air chamber 200 may be an annular hollow tube enclosed in fuel gas chamber 250 of a hollow cylinder shape, and air inlet 220 may penetrate though fuel gas chamber 250, for example, through bottom plate 260 to reach and attach to air chamber 200.

As shown in FIG. 1, the plurality of holes 110, 120, and 130 of combustion plate 100 may be arranged in concentric circles with different radii. For example, a first plurality of holes 110 may be arranged in a first circle having a first radius, a second plurality of holes 120 may be arranged in a second circle having a second radius, and a third plurality of holes 130 may be arranged in a third circle having a third radius. In some embodiments, the radius of the second circle may be smaller than that of the first circle and larger than that of the third circle so that the second circle may be sandwiched between the first circle and the third circle. In some embodiments, the first plurality of holes 110 may be fluidly connected to air chamber 200, the second plurality of holes 120 may be fluidly connected to fuel gas chamber 250, and the third plurality of holes 130 may be fluidly connected to air chamber 200 or fuel gas chamber 250.

In some embodiments, additional holes arranged in additional circles having different radii may be formed in combustion plate 100. For example, additional holes of combustion plate 100 arranged in circles having radii larger than that of the first circle or smaller than the third circle may fluidly connect to air chamber 200. For another example, additional holes of combustion plate 100 arranged in circles having radii smaller than that of the first circle or larger than that of the third circle may fluidly connect to fuel gas chamber 250. In the following description, holes 110, 120, and 130 are used for the purpose of illustrating exemplary embodiments of the present disclosure.

Figure 2:
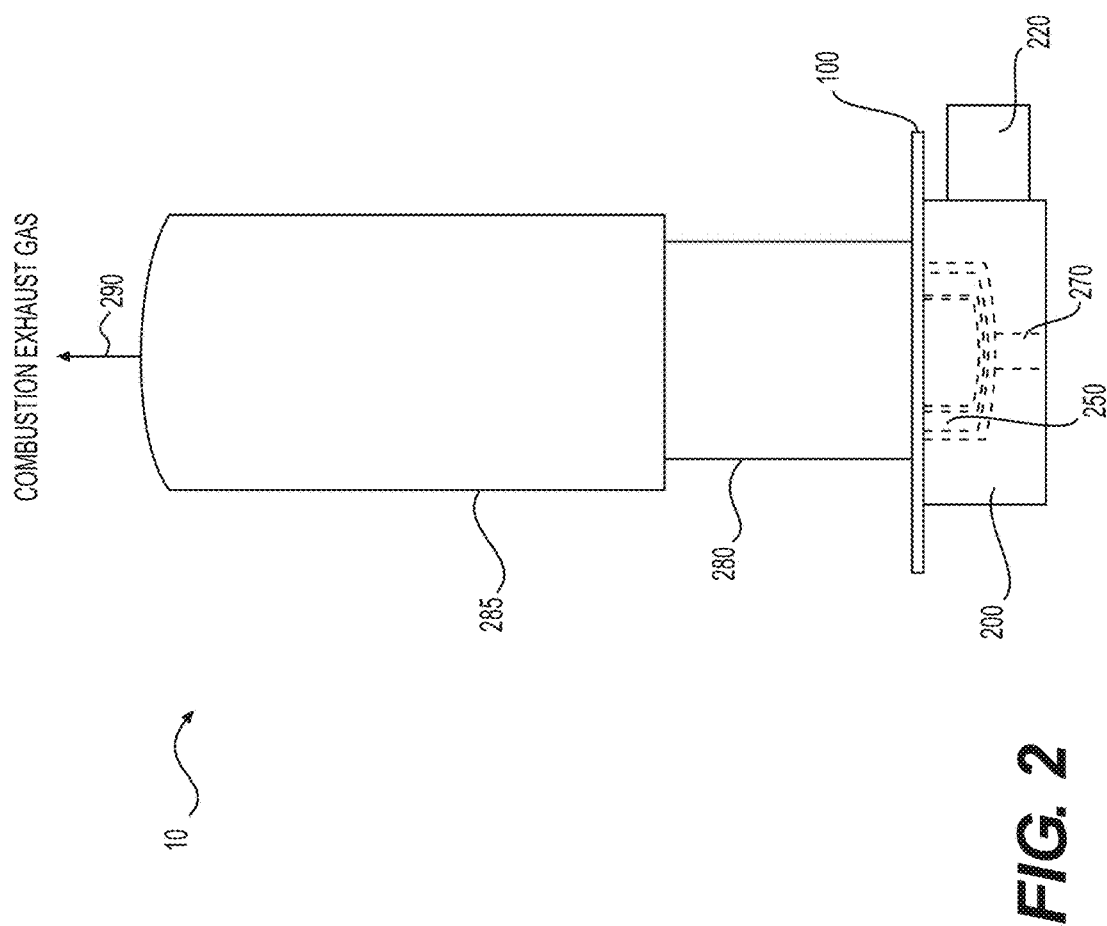
FIG. 2 is a schematic illustration of a burner assembly, according to an exemplary embodiment.

In some embodiments, the combustion of the fuel gas and air may occur adjacent to top surface 102 of combustion plate 100. For example, a fuel gas flow may be supplied via fuel gas inlet 270 to fuel gas chamber 250 and an air flow may be supplied via air inlet 220 to air chamber 200. The air flow may be discharged through first and/or third plurality of holes 110 and 130 and the fuel gas flow may be discharged through second plurality of holes 120 at predetermined velocities. The fuel gas flow and air flow may be mixed after being discharged through the holes and may be configured to combust, for example, by ignition. In some embodiments, burner assembly 10 may further include a combustion chamber 280. As shown in FIG. 2, combustion chamber 280 may be a cylindrical tube and may have one end removably or permanently attached to top surface 102 of combustion plate 100. In some embodiments, the combustion of the fuel gas and air may create a combustion flame in combustion chamber 280 and generate a combustion exhaust gas 290 discharged from the other end of combustion chamber 280. In some embodiments, combustion chamber 280 may connect to another combustion chamber 285 configured to provide a passage for combustion exhaust gas 290.

The temperature of the combustion flame can affect and/or determine the formation and/or emission of thermal $NO_x$ in combustion exhaust gas 290. As discussed herein, the higher the temperature of the combustion flame, the more thermal $NO_x$ can be formed during combustion and the higher the concentration of $NO_x$ can be in combustion exhaust gas 290. Reducing the temperature of the combustion flame may limit, suppress, and/or minimize $NO_x$ formation. One method for reducing the temperature of the combustion flame is increasing the mixing of the fuel gas flow and the air flow during combustion, and thus reduce $NO_x$ formation. In addition, causing adequate and/or complete mixing of the fuel gas flow and the air flow during combustion may minimize the temperature of the combustion flame, and thus suppress and/or minimize $NO_x$ formation. According to an exemplary embodiment, one method for increasing the mixing of the fuel gas flow and the air flow may include using combustion plate 100 having a selection of holes 110, 120, and 130 tilted. The tilted holes may generate tangential velocities of the fuel gas flow and air flow, increasing or allowing adequate and/or complete mixing of the fuel gas flow and air flow during combustion.

Figure 3:
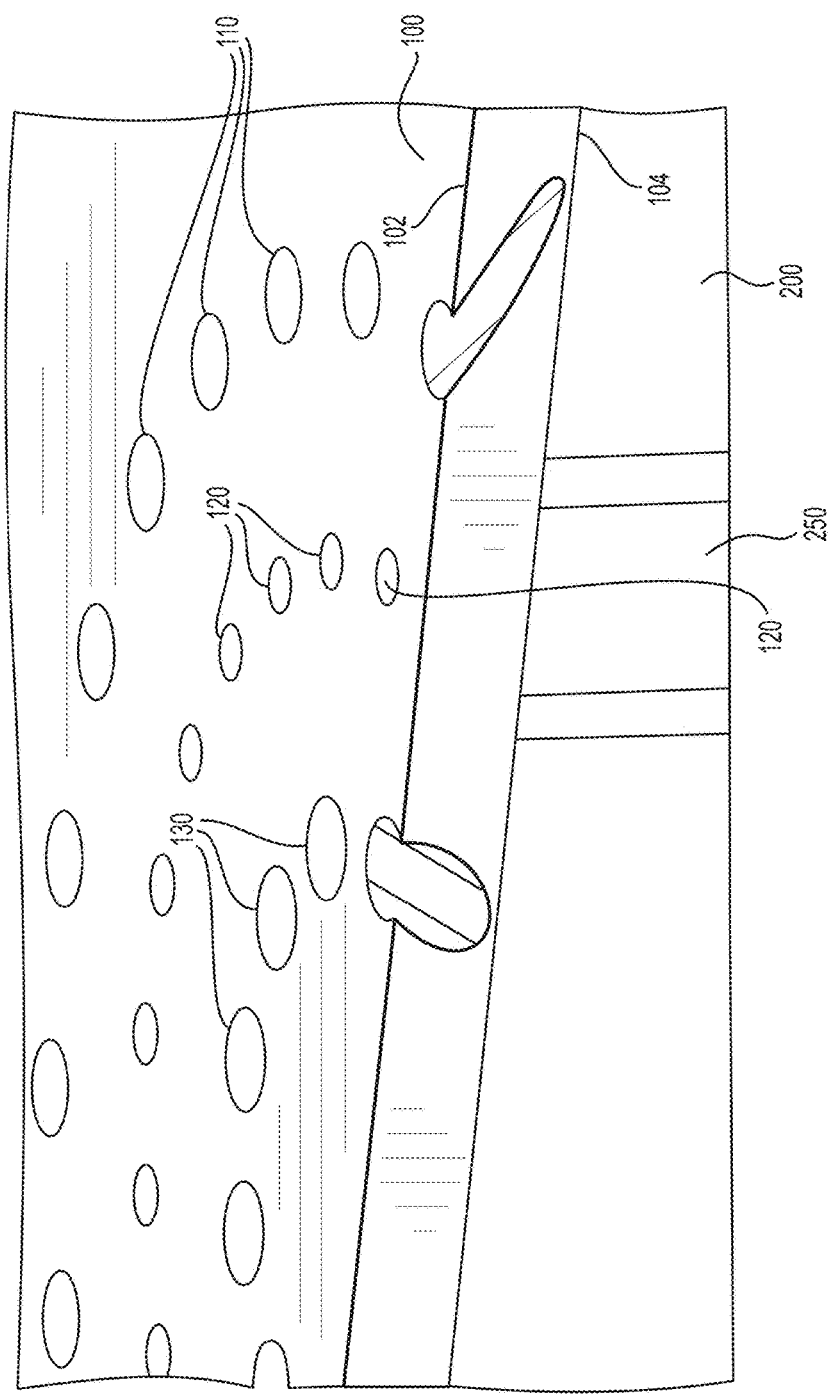
FIG. 3 is an enlarged partial cross-sectional view of a burner assembly, according to an exemplary embodiment.

In some embodiments, for example, at least one of holes 110, 120, and 130 of combustion plate 100 may be configured to be tilted from a plane of combustion plate 100. For example, as shown in FIG. 3, combustion plate 100 may have a predetermined thickness extending from top surface 102 to bottom surface 104. At least one of the holes 110, 120, and 130 may extend through the thickness of combustion plate 100 from top surface 102 to bottom surface 104 and may be tilted from the plane of combustion plate 100. As disclosed herein, any number of a selection of holes 110, 120, and 130 may have the tilt from the plane of combustion plate 100. For example, a first number of holes 110 may be tilted, a second number of holes 120 may be tilted, and/or a third number of holes 130 may be tilted. For the purpose of illustrating the present disclosure, a selection of a plurality of holes selected from holes 110, 120, and/or 130 are tilted from the plane of combustion plate 100. In some embodiments, the tilted holes may be in the form of an oblique cylinder. For example, FIG. 4 is a geometric illustration of the tilt of an exemplary hole among the plurality of tilted holes.

Figure 4:
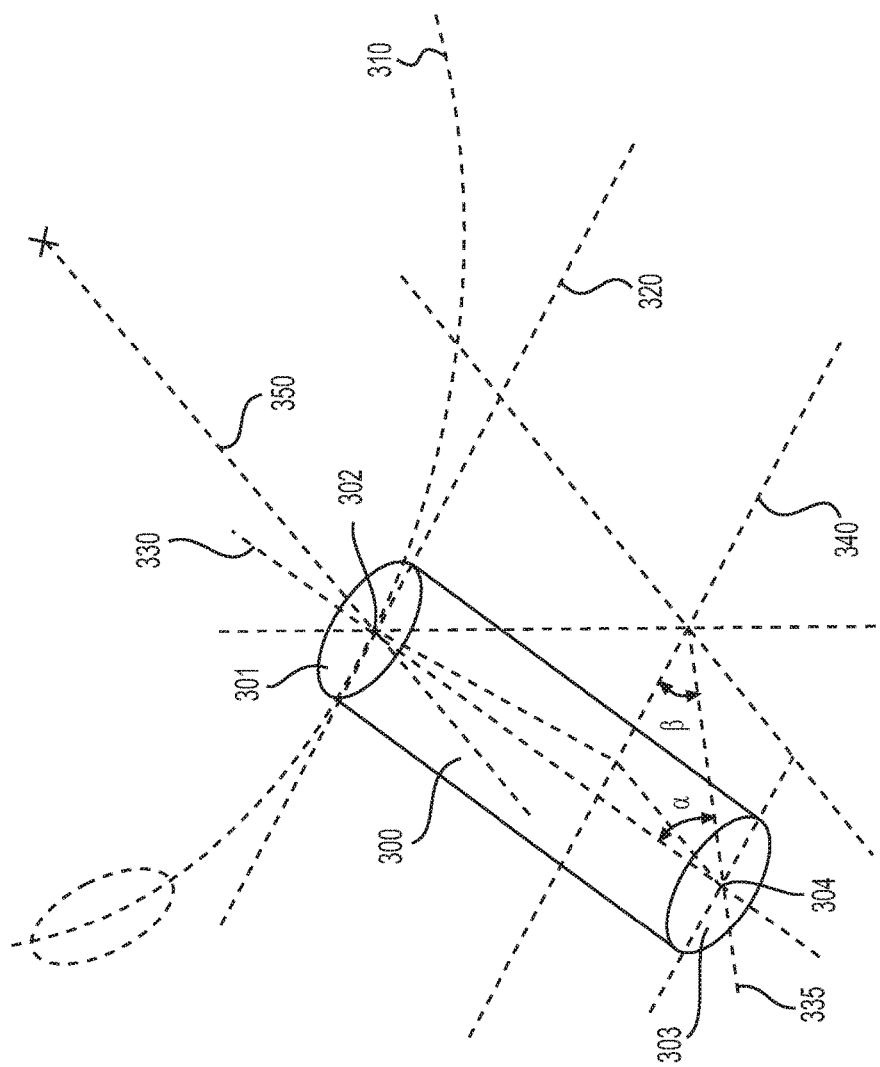
FIG. 4 is a geometric illustration of an exemplary hole of a burner assembly, according to an exemplary embodiment.

As shown in FIG. 4, an exemplary hole 300 may have a longitudinal axis 330 extending from a first center 302 of a top end 301 of exemplary hole 300 on top surface 102 of combustion plate 100 to a second center 304 of a bottom end 303 of exemplary hole 300 on bottom surface 104 of combustion plate 100. In exemplary embodiments, longitudinal axis 330 may be tilted at a first angle α from the plane of combustion plate 100 or any plane parallel to the plane of combustion plate 100 in the three-dimensional space. For example, a concentric circle 310, by which a plurality of exemplary holes 300 are arranged and which passes through first center 302 of top end 301 of exemplary hole 300, and a radius 350 of concentric circle 310 may define a first plane of combustion plate 100 on top surface 102. A second plane of combustion plate 100 may be defined as the plane parallel to the first plane passing through second center 304 of bottom end 303 of exemplary hole 300 on bottom surface 104. Longitudinal axis 330 may be tilted from either the first plane or second plane of combustion plate 100 or a plane parallel to the plane of combustion plate 100. In some embodiments, exemplary hole 300 or longitudinal axis 330 may be described as being tilted inward to the plane of combustion plate 100 when first angle α is an acute angle, i.e., is smaller than about 90°, and/or as being tilted outward from the plane of combustion plate 100 when the supplementary angle of first angle α is an acute angle. In some embodiments, a segment along longitudinal axis 300 of exemplary hole 300 may be tilted at first angle α and the rest of exemplary hole 300 may be straight.

Figure 5:
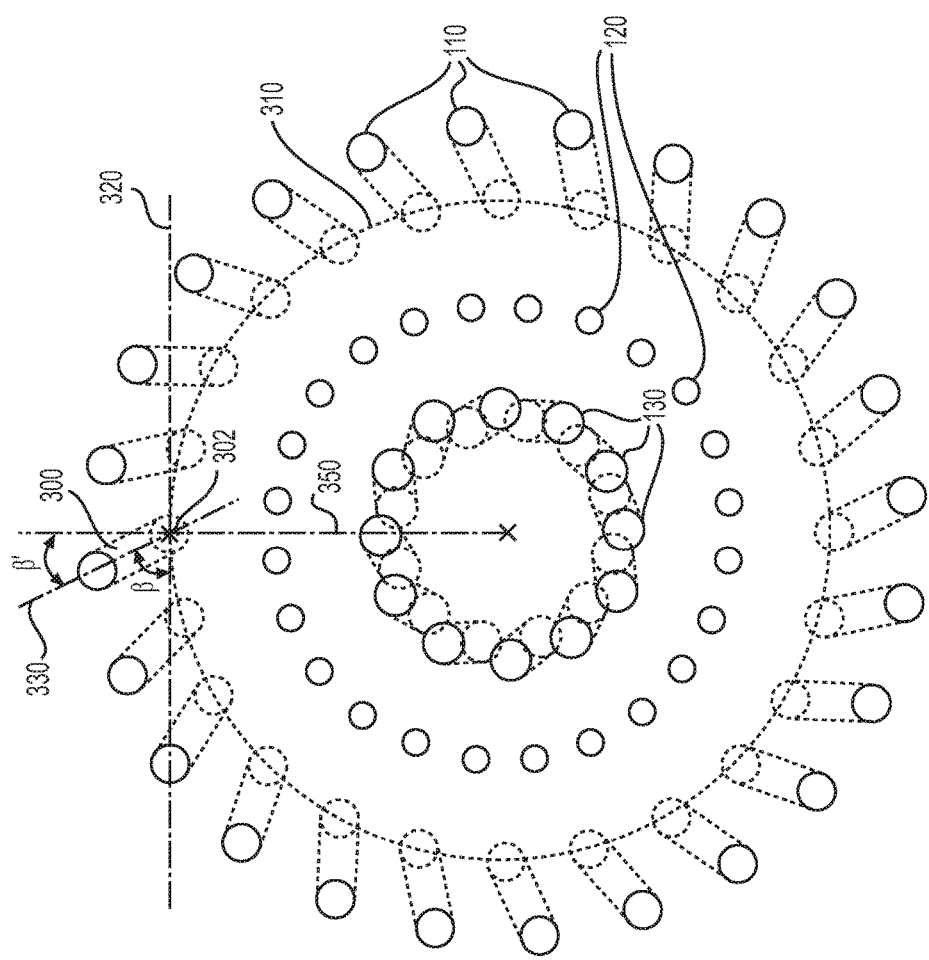
FIG. 5 is a schematic illustration of exemplary holes of a burner assembly, according to an exemplary embodiment.

In some embodiments, longitudinal axis 330 may be tilted at a second angle from a tangent line of one of the concentric circles. For example, as shown in FIG. 4, a tangent line 320 of concentric circle 310 on the first plane of combustion plate 100 may have a projection 340 on the second plane parallel to the first plane passing through second center 304 of bottom end 303 of exemplary hole 300. Longitudinal axis 330 may also have a projection 335 on the second plane forming at a second angle β from projection 340 of tangent line 320 on the second plane. In some embodiments, second angle β may be used to describe the second angle of longitudinal axis 330 tilted from tangent line 320 of concentric circle 310 on the first plane. In some embodiments, since tangent lines of other concentric circles parallel to tangent line 320 may be aligned in the same direction, second angle β may be used to describe the tilt of longitudinal axis 330 to any of the tangent lines parallel to tangent line 320. FIG. 5 illustrates the tilt of longitudinal axis 330 according to an exemplary embodiment. The schematic illustration of FIG. 5 depicts an exemplary arrangement of holes 110, 120, and 130 as being seen from bottom surface 104 on a plane of combustion plate 100. Exemplary hole 300 is shown as one of holes 110. Circles drawn with solid lines illustrate bottom ends 303 of the holes on bottom surface 104 of combustion plate 100 and circles draw with dashed lines illustrate top ends 301 of the holes on top surface 102 of combustion plate 100. As shown in FIG. 5, exemplary hole 300 or longitudinal axis 330 of exemplary hole 300 may be tilted from tangent line 320 of concentric circle 310 by which holes 110 are arranged on the plane of combustion plate 100. In some embodiments, exemplary hole 300 may be described as being tilted around radius 350 of concentric circle 310 at third angle β' on the plane of combustion plate 100. Second angle β and third angle β' may be complementary angles and add up to 90°. In some embodiments, a segment along longitudinal axis 300 of exemplary hole 300 may be tilted at second angle β or third angle β' and the rest of exemplary hole 300 may be straight or only be tilted at first angle α.

In exemplary embodiments, the selected holes configured to be tilted at first angle α and/or second angle β may form pathways for the fuel gas flow and/or the air flow and may allow the fuel gas flow or the air flow to be discharged at tangential velocities to increase mixing and/or allow sufficient mixing of the fuel gas flow and the air flow. In some embodiments, holes 110 providing pathways for the air flow may be tilted from the plane of combustion plate 100 at first angle α and/or tilted from a tangent line of a concentric circle by which holes 110 are arranged at a second angle β. Such configuration of holes 110 may allow the air flow to be discharged at a set of tangential velocities into combustion chamber 280 and mix and combust with the fuel gas flow discharged from holes 120. In some embodiments, holes 120 providing pathways for the fuel gas flow may be tilted from the plane of combustion plate 100 at first angle α and/or tilted from a tangent line of a concentric circle by which holes 120 are arranged at second angle β. Such configuration of holes 120 may allow the fuel gas flow to be discharged at a set of tangential velocities into combustion chamber 280 and mix and combust with the air flow discharged from holes 110. In some embodiments, holes 110 providing pathways for air flow may be tilted inward to the plane of combustion plate 100 at a first angle α and holes 130 providing additional pathways for the air flow may be tilted inward to or outward away from the plane of combustion plate 100 at another first angle α. Such configuration of holes 110 and holes 130 may allow the air flow to be discharged at a first set of tangential velocities through holes 110 and at a second set of tangential velocities through holes 130 into combustion chamber 280. The directions and/or magnitudes of the second set of tangential velocities may differ from those of the first set of tangential velocities. In some embodiments, both of the first and second sets of tangential velocities may direct the air flow towards the fuel gas flow discharged from holes 120 and allow the air flow to mix and combust with the fuel gas flow.

Figure 6:
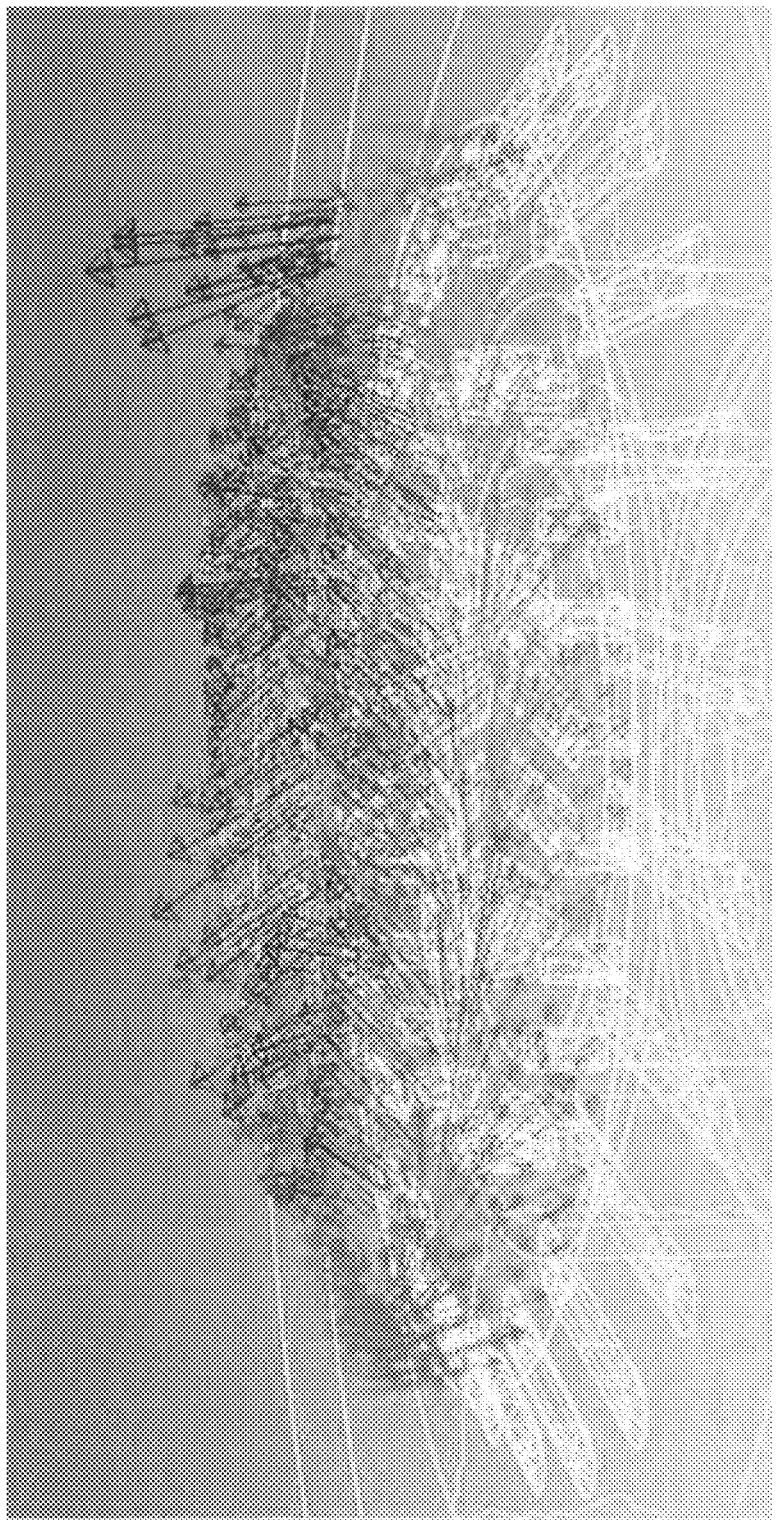
FIG. 6 is a schematic illustration of exemplary velocities of the fuel gas flow and air flow of a burner assembly according to an exemplary embodiment.

In exemplary embodiments, combustion plate 100 of burner assembly 10 may be configured to increase the mixing of the fuel gas flow and the air flow and generate a swirling combustion flame during the combustion of fuel gas and air in combustion chamber 280. For example, as shown in FIG. 6, exemplary directions of the tangential velocities of the fuel gas flow and/or the air flow are shown as arrows. The directions of the tangential velocities may increase the mixing by introducing immediate reactions between the fuel gas flow and the air flow discharged through the tilted holes. For example, comparing to a burner assembly having straight holes through which the air flow and fuel gas flow are discharged, burner assembly 10 may increase the mixing between the fuel gas flow and air flow and reduce the peak temperature of the swirling combustion flame generated by burner assembly 10 by from about 30° C. to 200° C. As described herein, in some embodiments, combustion plate 100 of burner assembly 10 may be configured to allow adequate and/or complete mixing of the fuel gas flow and the air flow and allow the formation of the swirling combustion flame during combustion. The reduced temperature of the swirling combustion flame may thus limit or suppress $NO_x$ formation during combustion and/or emission or the concentration of $NO_x$ in combustion exhaust gas 290 discharged from combustion chamber 280.

In some embodiments, the tangential velocities of the fuel gas flow discharged from holes 120 and the tangential velocities of the air flow discharged from holes 110 and/or holes 130 may be controlled and/or regulated. In some embodiments, controlling or regulating of the tangential velocities of the fuel gas flow and/or air flow may allow balanced flow rates between the fuel gas flow and the air flow, optimized stoichiometry between the fuel gas and air during combustion, optimized mixing of the fuel gas flow and air flow, and/or optimized combustion efficiency to reduce the combustion flame temperature. In some embodiments, controlling or regulating of the tangential velocities of the fuel gas flow and/or air flow may reduce or minimize $NO_x$ formation during combustion and thus $NO_x$ emission from combustion chamber 280 of burner assembly 10. In some embodiments, the tangential velocities of the fuel gas flow discharged from holes 120 and the tangential velocities of the air flow discharged from holes 110 and/or holes 130 may reduce $NO_x$ formation during combustion by reducing initial turbulence at the start of the combustion.

In exemplary embodiments, any selection or combination of holes 110, 120, and 130, and additional holes of combustion plate 100 may be configured to extend at first angle α from the plane of combustion plate 100 and/or second angle β from a tangent line of one of the concentric circles on the plane of combustion plate 100. In some embodiments, a selection of holes 110 may be tilted at first angle α and/or second angle β. In some embodiments, a selection of holes 120 may be tilted at first angle α and/or second angle β. In some embodiments, a selection of holes 130 may be tilted at first angle α and/or second angle β. In some embodiments, a selection of holes 110 and holes 130 may be tilted at first angle α and/or second angle β. In some embodiments, a selection of holes 110 and holes 120 may be tilted at first angle α and/or second angle β. In some embodiments, a selection of holes 120 and holes 130 may be tilted at first angle α and/or second angle β. In some embodiments, a selection of holes 110, 120, and 130 may be tilted at first angle α and/or second angle β. In some embodiments, holes 110 and holes 130 may be configured to be tilted at different first angles α and/or different second angles β. In some embodiments, holes 110 and holes 120 may be configured to be tilted at different first angles α and/or different second angles β. In some embodiments, holes 120 and holes 130 may be configured to be tilted at different first angles α and/or different second angles β. In some embodiments, holes 110, 120, and 130 may be configured to be tilted at different first angles α and/or different second angles β.

In some embodiments, any selection of holes 110, 120, and 130 may be configured to tilt from the plane of combustion plate 100 at first angle α. In some embodiments, first angle α or its supplementary angle may be an acute angle. In some embodiments, first angle α or its supplementary angle may range from about 0° to about 15°, from about 0° to about 30°, from about 0° to about 45°, from about 0° to about 60°, from about 0° to about 75°, from about 0° to about 90°, from about 15° to about 30°, from about 15° to about 45°, from about 15° to about 60°, from about 15° to about 75°, from about 15° to about 90°, from about 30° to about 45°, from about 30° to about 60°, from about 30° to about 75°, from about 30° to about 90°, from about 45° to about 60°, from about 45° to about 75°, from about 45° to about 90°, from about 75° to about 90°, from about 90° to about 105°, from about 90° to about 135°, from about 90° to about 165°, from about 105° to about 135°, from about 105° to about 165°, from about 135° to about 165°, from about 105° to about 180°, or from about 90° to about 180°, from about 105° to about 180°, from about 135° to about 180°, or from about 165° to about 180°. In exemplary embodiments, first angle α or its supplementary angle may be configured not to be around 0°, 90°, and/or 180°. In some embodiments, when first angle α of any selection of holes 110, 120, and 130 is configured to be an acute angle, i.e., smaller than about 90°, the selected holes may be described as being tilted inward to the plane of combustion plate 100 at first angle α. In some embodiments, when the supplementary angle of first angle α of any selection of holes 110, 120, and 130 is configured to be an acute angle, the selected holes may be described as being tilted outward from the plane of combustion plate 100 at first angle α.

In some embodiments, any selection of holes 110, 120, and 130 may be described as being tilted from a tangent line of one of the concentric circles at second angle β or tilted around radius 350 on the plane of combustion plate 100 at third angle β'. In some embodiments, second angle β and third angle β' may be complementary to each other and add up to 90°. In some embodiments, second angle β or third angle β' may be an acute angle. In exemplary embodiments, second angle β or third angle β' may range from about 0° to about 15°, from about 0° to about 30°, from about 0° to about 45°, from about 0° to about 60°, from about 0° to about 75°, from about 0° to about 90°, from about 15° to about 30°, from about 15° to about 45°, from about 15° to about 60°, from about 15° to about 75°, from about 15° to about 90°, from about 30° to about 45°, from about 30° to about 60°, from about 30° to about 75°, from about 30° to about 90°, from about 45° to about 60°, from about 45° to about 75°, from about 45° to about 90°, from about 75° to about 90°. In exemplary embodiments, second angle β or third angle β' may be configured not to be around 0° and/or 90°. In some embodiments, the number of holes 110, 120, or 130 arranged in one concentric circle may range from 3 to 300. In some embodiments, the number of additional holes arranged in one of the additional concentric circles may range from 3 to 300. In some embodiments, the holes arranged in one concentric circle may be distributed evenly along the perimeter of the circle.

In some embodiments, first angle α and/or second angle β of a selection or combination of holes 110, 120, and 130 may be adjustable. For example, a selection of holes may be equipped with adjustable fixtures movable and/or rotatable to adjust first angle α and/or second angle β individually or in combination. Each adjustable fixture may have a motor configured to adjust the movement and/or rotation of the fixture. In some embodiments, each adjustable fixture may be configured to operatively connect to a controller or a processor that may operate according to a programmable set of instructions stored in a non-transitory memory device. In some embodiments, the adjustable fixtures may open or close the selection of holes individually or in combination under the instruction of the controller or processor. In some embodiments, first angle α and/or second angle β of a selection or combination of holes 110, 120, and 130 may be adjusted individually or collectively to stabilize the swirling combustion flame, optimize the mixing of fuel gas flow and air flow, reduce the temperature of the swirling combustion flame, and/or achieve optimum $NO_x$ reduction or suppression during combustion.

In exemplary embodiments, the thickness of combustion plate 100 may be, for example, range from about 2 mm to about 40 mm, about 4 mm to about 35 mm, about 6 mm to about 30 mm, about 8 mm to about 25 mm, about 10 mm to about 20 mm, about 12 mm to about 15 mm. In some embodiments, the diameter of combustion plate may range from about 10 mm to about 2000 mm, about 100 mm to about 1500 mm, about 200 mm to about 1000 mm, about 300 mm to about 900 mm, about 400 mm to about 800 mm, about 500 mm to about 700 mm. In some embodiments, the diameter of holes 110 may range from about 0.2 mm to about 100 mm, about 0.5 mm to about 50 mm, about 1 mm to about 25 mm, about 2 mm to about 12 mm, about 4 mm to about 10 mm, about 6 mm to about 8 mm. In some embodiments, the diameter of holes 120 may range from about 0.2 mm to about 100 mm, about 0.5 mm to about 50 mm, about 1 mm to about 25 mm, about 2 mm to about 12 mm, about 4 mm to about 10 mm, about 6 mm to about 8 mm. In some embodiments, the diameter of holes 130 may range from about 0.2 mm to about 100 mm, about 0.5 mm to about 50 mm, about 1 mm to about 25 mm, about 2 mm to about 12 mm, about 4 mm to about 10 mm, about 6 mm to about 8 mm. In some embodiments, the cross-sectional area of a selection of holes 110, 120, and/or 130 may decrease along the longitudinal axis from bottom surface 104 to top surface 102, producing a nozzle for discharging the fuel gas flow and/or the air flow. In some embodiments, burner assembly 10 may be made of at least one material selected from metal, metal alloy, and inorganic material such as glass, porcelain, ceramic, silicon carbide, and combinations. In some embodiments, burner assembly 10 may be made by casting, injection molding or additive manufacturing techniques, for example, such as 3D printing. In some embodiments, the numbers, angles, arrangement, and/or configuration of holes 110, 120, and 130 may be designed, modeled, and optimized by computer aided design tools. In some embodiments, burner assembly 10 may be by fabricated by welding or bolting air gas chamber 200 and fuel gas chamber 250 to combustion plate 100.

In some embodiments, the temperature of the swirling combustion flame near top surface 104 of combustion plate 100 may range from about 20° C. to about 1900° C. In some embodiments, the temperature of the swirling combustion flame may depend on the distance of the swirling combustion flame away from top surface 104. For example, the temperature of the swirling combustion flame in combustion chamber 280 may range from about 20° C. to about 1400° C. at a distance ranging from about 0 cm to about 1 cm away from top surface 104, and may range from about 20° C. to about 1900° C. at a distance ranging from about 1 cm to about 15 cm away from top surface 104. In some embodiments, one or more temperature sensors may be placed and distributed adjacent the walls of combustion chamber 280 and/or additional combustion chamber 285 to detect the temperatures of the swirling combustion flame adjacent to the locations of the temperature sensors. In some embodiments, the temperature sensors may be configured to generate and send one or more feedback signals to a controller configured to control the flow rate of the fuel gas flow and the air flow, and/or control the sizes, angles, opening, and/or closing of holes 110, 120, and/or 130 until a predetermined threshold temperature is reached.

In some embodiments, the concentration of $NO_x$ in combustion exhaust gas 290 may depend on the distance away from top surface 104. For example, in some embodiments, the concentration of $NO_x$ in combustion exhaust gas 290 may range from about 0 ppm to about 30 ppm at a distance ranging from about 0 cm to about 20 cm from top surface 104, and may range from about 0 ppm to about 15 ppm at a distance ranging from about 30 cm to about 50 cm from top surface 104. In some embodiments, the concentration of $NO_x$ in combustion exhaust gas 290 may become lower at a further distance away from top surface 104 of combustion plate 100. For example, the concentration of $NO_x$ in combustion exhaust gas 290 may range from about 0 ppm to about 7 ppm at a distance ranging from about 50 cm to about 100 cm from top surface 104. In some embodiments, one or more $NO_x$ sensors may be placed and distributed adjacent the outlet of combustion chamber 280 and/or additional combustion chamber 285 to detect the concentrations of $NO_x$ in combustion exhaust gas 290 adjacent to the $NO_x$ sensors. In some embodiments, the $NO_x$ sensors may be configured to generate and send one or more feedback signals to a controller configured to control the flow rate of the fuel gas flow and the air flow, and/or control the sizes, angles, opening, and/or closing of holes 110, 120, and/or 130 to reduce the concentration of $NO_x$ in combustion exhaust gas 290 until a predetermined threshold level is met. In some embodiments, the concentration of $NO_x$ in combustion exhaust gas 290 may conform with various air quality standards, such as the National Ambient Air Quality Standards (NAAQS), the California Environmental Protection Agency Air Resources Board (CARB), and the South Coast Air Quality Management District (SCAQMD) regulations.

In some embodiments, a first valve may be configured to control the flow rate of the fuel gas flow to inlet 270 attached to fuel chamber 250 and a second valve may be configured to control the flow rate of the air flow to inlet 220 attached to air chamber 200. The first and second values may be controlled to regulate the flow rate of fuel gas flow discharged from holes 120 and air flow discharged from holes 110 and/or 130 to adjust, increase, and/or optimize the mixing and relative supply or the stoichiometry of the fuel gas flow and air flow during combustion to reduce the temperature of the swirling combustion flame and thus to limit or minimize $NO_x$ formation. In some embodiments, the flow rates of the fuel gas flow to inlet 270 and the air flow to inlet 220 may be regulated based on the feedback signals from the temperature sensors and/or the $NO_x$ sensors. In some embodiments, the tangent velocities and thus the mixing of the fuel gas flow discharged from holes 120 and air gas flow discharged from holes 110 and/or holes 130 may be regulated based on the feedback signals from the temperature sensors and/or the $NO_x$ sensors.

Burner assembly 10 was modeled to simulate the combustion reaction of a fuel gas flow and an air flow. Holes 110 were configured to be tilted inward to the plane of combustion plate 100 at a first angle α of about 60° and holes 130 were configured to be tilted inward to the plane of combustion plate 100 at a first angle α of about 25°. Each of holes 110 and 130 was configured as being tilted from a tanged line of the concentric circle by which holes 110 or holes 130 are arranged at a second angle β of about 50°. Holes 120 were configured as extending straight from top surface 102 to bottom surface 104. A normal burner assembly with holes 110, 120, and 130 configured as extending straight from top surface 102 to bottom surface 104 was also modeled to compare with burner assembly 10 and demonstrate the advantage of burner assembly 10. As shown in FIG. 7, burner assembly 10 having tilted holes 110 and 130 can generate a swirling combustion flame with lower temperatures than the normal burner assembly having straight holes so that burner assembly 10 having tilted holes 110 and 130 can form less $NO_x$ during combustion and emit a smaller concentration of $NO_x$ in combustion exhaust gas 290 discharged from combustion chamber 280 than those of a normal burner assembly having straight holes. The simulation results in FIG. 7 demonstrate that burner assembly 10 according to the present disclosure can have lower $NO_x$ formation and/or emission comparing to a normal burner assembly having straight holes for discharging the fuel gas flow and air flow.

Figure 8:
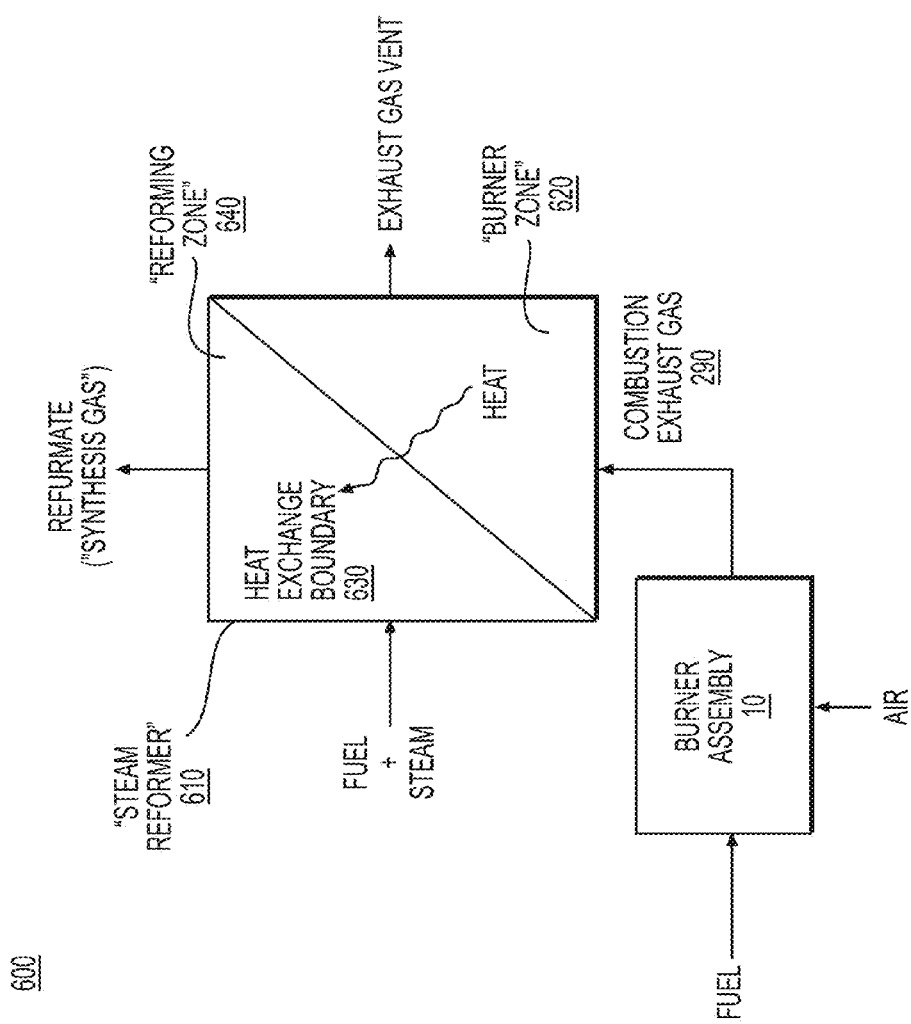
FIG. 8 is a schematic illustration of a hydrogen generator, according to an exemplary embodiment.

In some embodiments, burner assembly 10 may be configured to provide heat or thermal energy to a steam reformer in a hydrogen generator. As shown in FIG. 8, hydrogen generator 600 may comprise burner assembly 10 and a steam reformer 610. Burner assembly 10 may be supplied with an air flow, for example, via inlet 220 and a fuel gas flow, for example, via inlet 270. The combustion of the fuel gas flow and air flow in burner assembly 10 may generate combustion exhaust gas 290 carrying the heat or thermal energy. Steam reformer 610 may comprise a burner zone 620, a heat exchange boundary 630, and a reforming zone 640. Combustion exhaust gas 290 may be supplied to burner zone 620 and the heat or thermal energy carried by combustion exhaust gas 290 may be transferred via heat exchange boundary 630 to reforming zone 640 through radiation and/or convection heat transfer. Reforming zone 640 may be supplied with a hydrocarbon feedstock flow and a steam, which may undergo the steam reforming reaction to produce a hydrogen reformate or "synthesis gas." In some embodiments, one or more burner assembly 10 may be used in steam reformer 610.

Methods of providing a heat source using burner assembly 10 according to exemplary embodiments may comprise directing an air flow through holes 110 and/or holes 130 and directing a fuel gas flow through holes 120 as described above. In some embodiments, the methods may comprise combusting the fuel gas flow and the air flow directed through the holes adjacent top surface 102 of combustion plate 100. In some embodiments, the methods may further comprise discharging the fuel gas flow at tangential velocities through holes 120 and the air flow at tangential velocities through holes 110 and/or 130. In some embodiments, the methods may further comprise increasing and/or optimizing the mixing of the fuel gas flow and air flow, and thus reducing and/or controlling the temperature of a swirling combustion flame to or below a threshold level. In some embodiments, the methods may further comprise limiting or suppressing $NO_x$ formation and/or emission from the burner assembly 10 by reducing and/or controlling the temperature of the swirling combustion flame.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A burner assembly, comprising:
   a combustion plate having a first surface and a second surface, comprising:
   a first plurality of holes extending from the first surface to the second surface arranged in a first circle that discharge an air flow; and
   a second plurality of holes extending from the first surface to the second surface arranged in a second circle that separately discharge a fuel gas flow;
   wherein the first circle and the second circle are concentric circles; and
   least one of the first plurality of holes has a longitudinal axis extending at a first acute angle from a plane of the combustion plate; and
   at least one of the first plurality of holes has a longitudinal axis extending at a second acute angle from a tangent line of one of the concentric circles on the plane of the combustion plate.

2. The burner assembly of claim 1, wherein at least one of the second plurality of holes has a longitudinal axis extending at a third acute angle from the plane of the combustion plate.

3. The burner assembly of claim 2, wherein at least one of the second plurality of holes has a longitudinal axis extending at a fourth acute angle from a tangent line of one of the concentric circles on the plane of the combustion plate.

4. The burner assembly of claim 1, further comprising a third plurality of holes extending from the first surface to the second surface arranged in a third circle, wherein the first circle, the second circle, and third circle are concentric circles and the second circle is sandwiched between the first circle and the third circle.

5. The burner assembly of claim 4, wherein at least one of the third plurality of holes has the longitudinal axis extending at an acute angle from the plane of the combustion plate and an acute angle from a tangent line of one of the concentric circles on the plane of the combustion plate.

6. The burner assembly of claim 4, wherein at least one of the third plurality of holes has the longitudinal axis extending at a first acute angle from the plane of the combustion plate and a second acute angle from a tangent line of one of the concentric circles on the plane of the combustion plate.

7. The burner assembly of claim 1, further comprising: a first chamber having an end attached to the second surface of the combustion plate and fluidly connected to the first plurality of holes; and a first inlet configured to be supplied with an air flow to the first chamber.

8. The burner assembly of claim 1, further comprising: a second chamber having an end attached to the second surface of the combustion plate and fluidly connected to the second plurality of holes; and a second inlet configured to be supplied with a fuel gas flow to the second chamber.

9. The burner assembly of claim 1, wherein the holes are configured to: increase the mixing of the air flow discharged from the first plurality of holes and the fuel gas flow discharged from the second plurality of holes; and generate a swirling combustion flame during combustion of the fuel gas flow.

10. The burner assembly of claim 9, wherein the temperature of the swirling combustion flame ranges from about 20° C. to 1900° C. adjacent the first surface.

11. The burner assembly of claim 1, wherein the first acute angle ranges from about 15° to about 75°.

12. A method for providing a heat source from a burner assembly, comprising:
    directing a fuel gas flow through a first plurality of holes extending from a first surface to a second surface of a combustion plate;
    separately directing an air flow through a second plurality of holes extending from the first surface to the second surface of the combustion plate; and directing the fuel gas flow and the air flow through the holes at tangential velocities;

generating a swirling combustion flame; and combusting the fuel gas flow and the air flow directed through the holes;

wherein the first plurality of holes are arranged in a first circle and the second plurality of holes are arranged in a second circle, the first and second circles being concentric circles; and at least one of the holes has a longitudinal axis extending at an acute angle from a plane of the combustion plate.

13. The method of claim 12, further comprising controlling the temperature of the swirling combustion to or below a level that limits NOx emission from the burner assembly, wherein the temperature of the swirling combustion flame ranges from about 20° C. to 1900° C. adjacent the first surface.

14. A hydrogen generator system for generating hydrogen, comprising:

a reformer; and a burner assembly, comprising:

a combustion plate having a first surface and a second surface, comprising:

a first plurality of holes extending from the first surface to the second surface arranged in a first circle; and a second plurality of holes extending from the first surface to the second surface arranged in a second circle;

wherein the first circle and second circle are concentric circles;

at least one of the holes has a longitudinal axis extending at an acute angle from a plane of the combustion plate; and the burner assembly is configured to combust a fuel gas flow directed through the first plurality of holes and an air flow directed through the second plurality of holes to generate a combustion exhaust gas flow supplied as a heat source to the reformer.

* * * * *

UNITED STATES PATENT AND TRADEMARK OFFICE
CERTIFICATE OF CORRECTION

| | | |
|---|---|---|
| PATENT NO. | : 10,197,269 B2 | Page 1 of 1 |
| APPLICATION NO. | : 15/213527 | |
| DATED | : February 5, 2019 | |
| INVENTOR(S) | : Li et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 95 days.

Signed and Sealed this
Seventh Day of February, 2023

Katherine Kelly Vidal
*Director of the United States Patent and Trademark Office*